(12) United States Patent
Avetisian et al.

(10) Patent No.: US 10,920,812 B2
(45) Date of Patent: Feb. 16, 2021

(54) FASTENER SYSTEM WITH EXPANDABLE RING

(71) Applicant: Centrix Inc., Kent, WA (US)

(72) Inventors: Edward Avetisian, La Crescenta, CA (US); Travis McClure, Kirkland, WA (US); Zarko Baic, Sylmar, CA (US)

(73) Assignee: Centrix Inc., Kent, WA (US)

( * ) Notice: Subject to any disclaimer, the term of this patent is extended or adjusted under 35 U.S.C. 154(b) by 233 days.

(21) Appl. No.: 15/917,513

(22) Filed: Mar. 9, 2018

(65) Prior Publication Data

US 2018/0258970 A1 Sep. 13, 2018

Related U.S. Application Data

(60) Provisional application No. 62/469,285, filed on Mar. 9, 2017.

(51) Int. Cl.
*F16B 13/04* (2006.01)
*F16B 13/12* (2006.01)
(Continued)

(52) U.S. Cl.
CPC .......... *F16B 13/045* (2013.01); *F16B 5/0642* (2013.01); *F16B 13/124* (2013.01);
(Continued)

(58) Field of Classification Search
CPC ................ F16B 19/1063; F16B 19/109; F16B 19/1072; F16B 13/0883; F16B 13/045; F16B 13/124
(Continued)

(56) References Cited

U.S. PATENT DOCUMENTS 494,745 A * 4/1893 Phillips ................. F16B 13/065
411/55
1,978,935 A 10/1934 Douglas
(Continued)

FOREIGN PATENT DOCUMENTS

EP 0275160 A2 7/1988
GB 413403 A 7/1934
(Continued)

OTHER PUBLICATIONS

ISA Korean Intellectual Property Office, International Search Report and Written Opinion Issued in Application No. PCT/US2018/021876, dated Jun. 26, 2018, WIPO, 12 pages.

*Primary Examiner* — Flemming Saether
(74) *Attorney, Agent, or Firm* — McCoy Russell LLP

(57) ABSTRACT

A fastener system is provided that includes a spindle bolt having a threaded section and a tooling interface at a head, a bolt body at least partially mated with the spindle bolt, including an anti-rotation slot and an outer surface, a nut including an interior threaded portion and an anti-rotation extension, and an expandable ring mated with the nut and including a lower clamping surface. In a clamping configuration of the fastener system, the lower clamping surface extends beyond the outer surface of the bolt body, the interior threaded portion of the nut is threadingly engaged with the threaded section of the spindle bolt, and the anti-rotation extension mates with the anti-rotation slot. In an installation configuration of the fastener system, a diameter of the lower clamping surface is less than a diameter of the lower clamping surface in the clamping configuration.

17 Claims, 9 Drawing Sheets

(51) Int. Cl.
*F16B 5/06* (2006.01)
*F16B 29/00* (2006.01)
*F16B 19/10* (2006.01)

(52) U.S. Cl.
CPC ......... *F16B 19/109* (2013.01); *F16B 19/1063* (2013.01); *F16B 29/00* (2013.01)

(58) Field of Classification Search
USPC .......... 411/54, 347, 353, 49–50, 55, 337, 15
See application file for complete search history.

(56) References Cited

U.S. PATENT DOCUMENTS

| | | | |
|---|---|---|---|
| 2,298,552 A * | 10/1942 | Du Vall | F16B 29/00 411/59 |
| 2,370,336 A | 2/1945 | Wallace | |
| 2,379,786 A | 7/1945 | Bugg et al. | |
| 2,392,491 A * | 1/1946 | Moran | F16B 19/1063 411/54 |
| 2,516,554 A * | 7/1950 | Coyne | F16B 19/1063 411/51 |
| 2,649,884 A | 8/1953 | Westover | |
| 2,775,155 A | 12/1956 | Tompkins et al. | |
| 2,936,015 A | 5/1960 | Rapata | |
| 2,994,242 A | 8/1961 | Buff et al. | |
| 3,469,493 A | 9/1969 | Fisher | |
| 3,657,955 A * | 4/1972 | McKay | F16B 19/1054 411/38 |
| 4,370,081 A | 1/1983 | Briles | |
| 4,457,652 A | 7/1984 | Pratt | |
| 4,579,491 A * | 4/1986 | Kull | F16B 19/1063 411/18 |
| 5,065,490 A | 11/1991 | Wivagg et al. | |
| 5,498,110 A * | 3/1996 | Stencel | F16B 19/1063 411/34 |
| 5,704,752 A | 1/1998 | Logerot | |
| 6,174,118 B1 | 1/2001 | Rebers | |
| 6,287,044 B1 | 9/2001 | Huber | |
| 2002/0144574 A1 | 10/2002 | Avetisian et al. | |
| 2004/0022596 A1* | 2/2004 | Belanger | F16B 19/1063 411/34 |
| 2007/0243037 A1 | 10/2007 | Pratt | |
| 2012/0230796 A1 | 9/2012 | McClure | |
| 2013/0061452 A1 | 3/2013 | Pratt | |
| 2016/0138628 A1 | 5/2016 | Niklewicz et al. | |

FOREIGN PATENT DOCUMENTS

| | | |
|---|---|---|
| GB | 624714 A | 6/1949 |
| GB | 1548964 A | 7/1979 |
| JP | H1151018 A | 2/1999 |

* cited by examiner

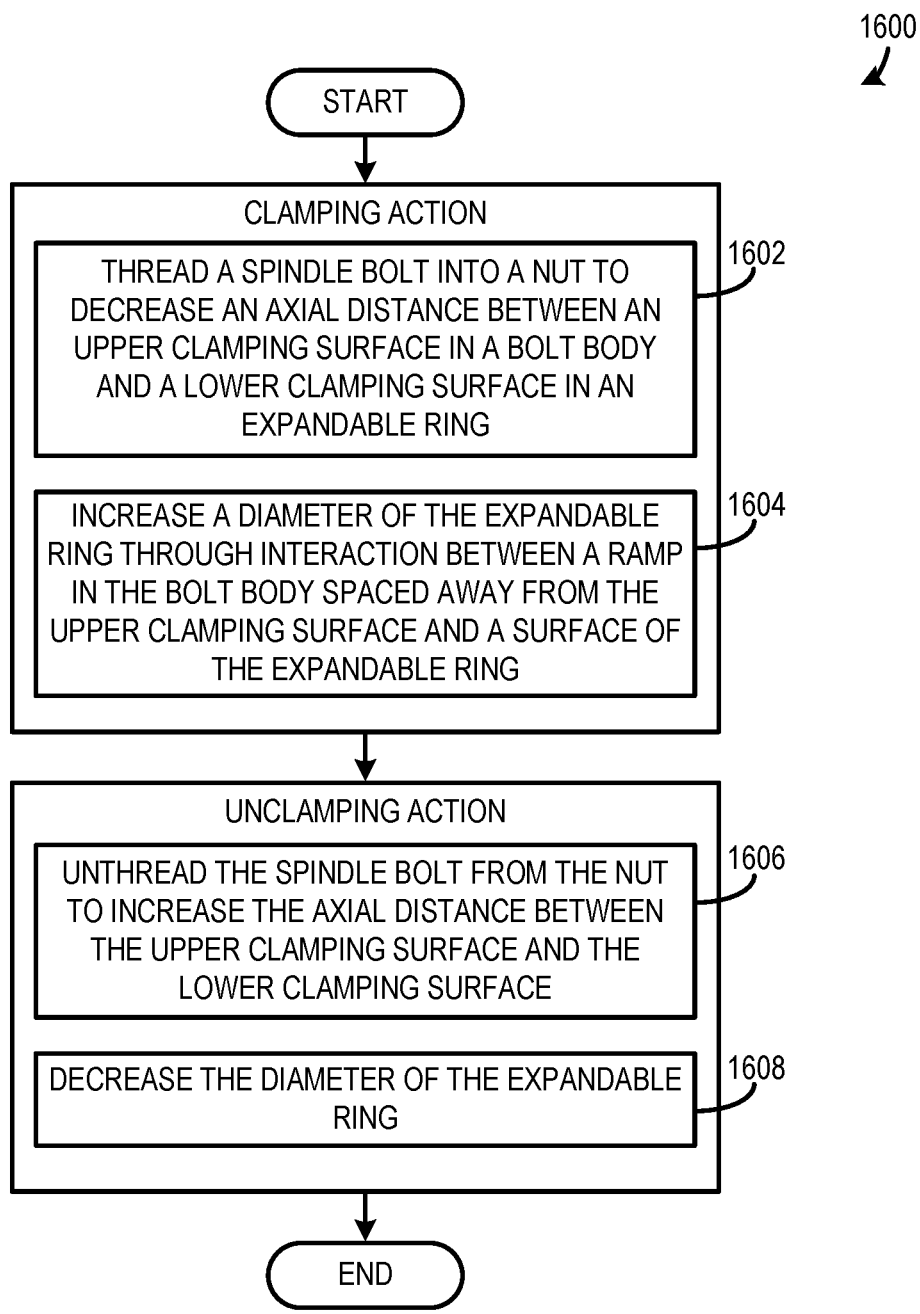

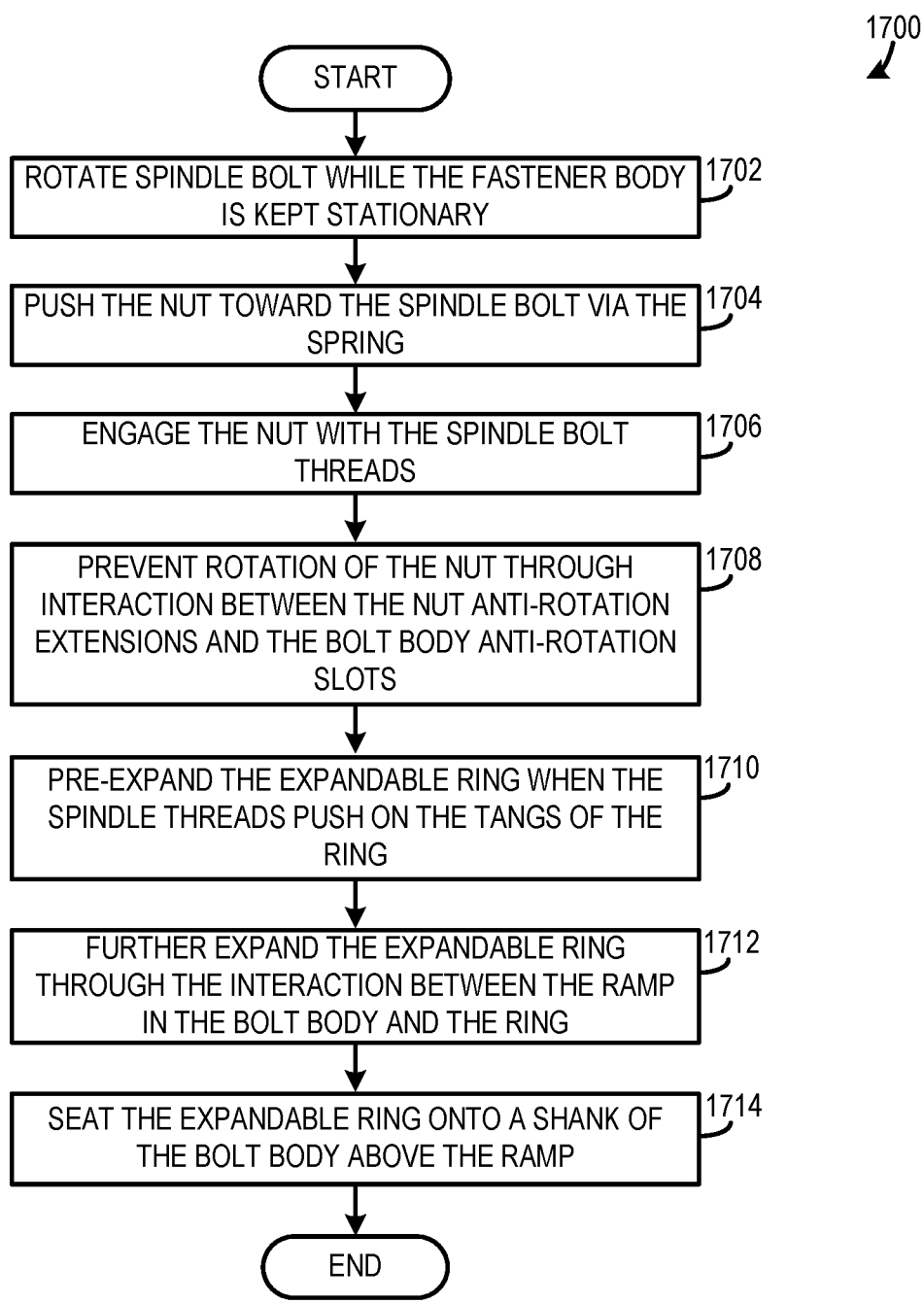

FASTENER SYSTEM WITH EXPANDABLE RING

CROSS REFERENCE TO RELATED APPLICATIONS

The present application claims priority to U.S. Provisional Application No. 62/469,285, entitled "RING CLAMP TOP DOWN FASTENER," and filed on Mar. 9, 2017. The entire contents of the above application are hereby incorporated by reference for all purposes.

FIELD

The present description relates generally to a fastener system designed to clamp two structures.

BACKGROUND/SUMMARY

Many manufacturing fields use fasteners, such as blind fasteners, to secure objects together. Blind fasteners are particularly useful when only one side of a joint is accessible. For instance, blind fasteners are used in the aerospace industry to secure interior panels, wing components, fuselage components, pylons, etc.

Previous blind fasteners have included clamping legs that are retracted as the fastener is inserted through holes in a workpiece. Subsequent to workpiece insertion, the legs are expanded to clamp workpiece sections together. However, the inventors have recognized several drawbacks with these type of single sided fasteners. For instance, the grip length of these fasteners may not accommodate a wide variance in workpiece thickness, limiting the fastener's adaptability. Theses fasteners may also have low structural integrity due to the flexion in the legs as well as other structural deficiencies. Moreover, previous singled sided fasteners may also be difficult to install and remove, using automated tooling for example, due to the large profile of the fastener head, making it more difficult to access and manipulate the fasteners. As a result, manufacturing costs associated with the fastener are increased and tooling the fastener in confined installation environments may be difficult or unfeasible, in some instances.

Facing the aforementioned problems, the inventors developed a fastener system to address at least some of the problems. In one example, the fastener system includes a spindle bolt having a threaded section and a tooling interface at a head, a bolt body at least partially mated with the spindle bolt, including an anti-rotation slot and an outer surface, a nut including an interior threaded portion and an anti-rotation extension, and an expandable ring mated with the nut and including a lower clamping surface. When the fastener is in a clamping configuration, the lower clamping surface extends beyond the outer surface of the bolt body, the interior threaded portion of the nut is threadingly engaged with the threaded section of the spindle bolt, and the anti-rotation extension mates with the anti-rotation slot. On the other hand, when the fastener is in an installation configuration, an outer diameter of the lower clamping surface is less than an outer diameter of the lower clamping surface in the clamping configuration. In this way, the expandable ring may expand and contract to provide clamping and unclamping functionality. The interaction between the bolt body slot and the expandable ring allows the fastener's grip length variability to be increased without increasing the profile of the fastener, if desired. Moreover, the arrangement between the expandable ring, nut, and bolt body allows the clamping force to be carried by stronger fastener components, thereby increasing the fastener's load carrying capacity, if desired.

In one example, the head of the spindle bolt may be flush with an upper surface of a crown of the bolt body. Consequently, the compactness of the fastener system may be increased, allowing the tooling efficiency of the fastener to be increased. In turn, manufacturing costs associated with fastener installation are reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 16 shows a method for installing and removing a fastener system.
FIG. 17 shows another method for operation of a fastener system.
FIGS. 1-15 are drawn approximately to scale, however other relative dimensions may be used in other embodiments.

DETAILED DESCRIPTION

The following description relates a durable fastener system with increased grip range when compared to previous fasteners. Other benefits that may be leveraged from the fastener system described herein also include increased fastener compactness, allowing for efficient fastener tooling, if desired. In one example, the fastener may include an expandable ring mated with a gap in a nut and having a lower clamping surface. During clamping action in the fastener, a spindle bolt is rotated to move the expandable ring upward toward an upper clamping surface in a bolt body. As the expandable ring moves upward the ring interacts with a ramp in the bolt body to expand the ring such that is extends beyond the bolt body's outer surface. Channels in the bolt body axially guide the nut and the expandable ring while preventing rotation of the nut and ring with regard to the bolt body. Using an expandable ring as the lower clamping surface enables the fastener to achieve increased grip length variance when compared to fasteners with clamping legs having a larger axial profile to accommodate leg flexion. Consequently, the fastener can be adapted for use is a wide variety of installation scenarios, thereby increasing the fastener's applicability. Moreover, the mating between the expandable ring and the nut allows the structural integrity of the fastener to be increased. In one example, the head of the spindle bolt may be flush with an upper surface of a crown of the bolt body. Consequently, the compactness of the fastener system may be increased. The increased compactness may also enable tools (e.g., automated tools) to more easily access the fastener, facilitating an increase in tooling efficiency.

Figure 1:
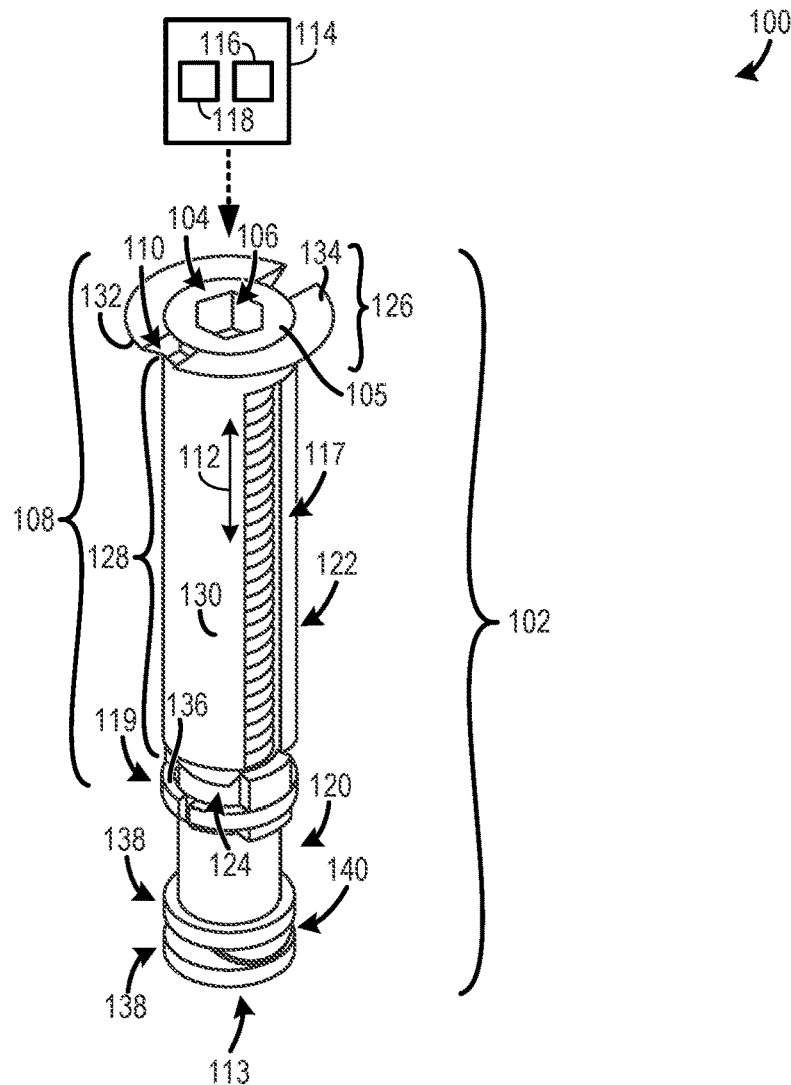
FIG. 1 shows a perspective view of a fastener system.
Figure 2:
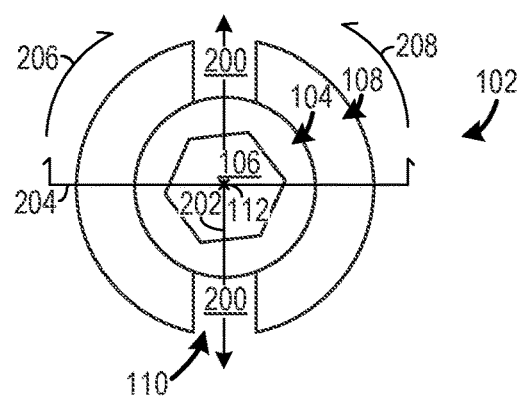
FIG. 2 shows a top view of the fastener system, illustrated in FIG. 1.
Figure 3:
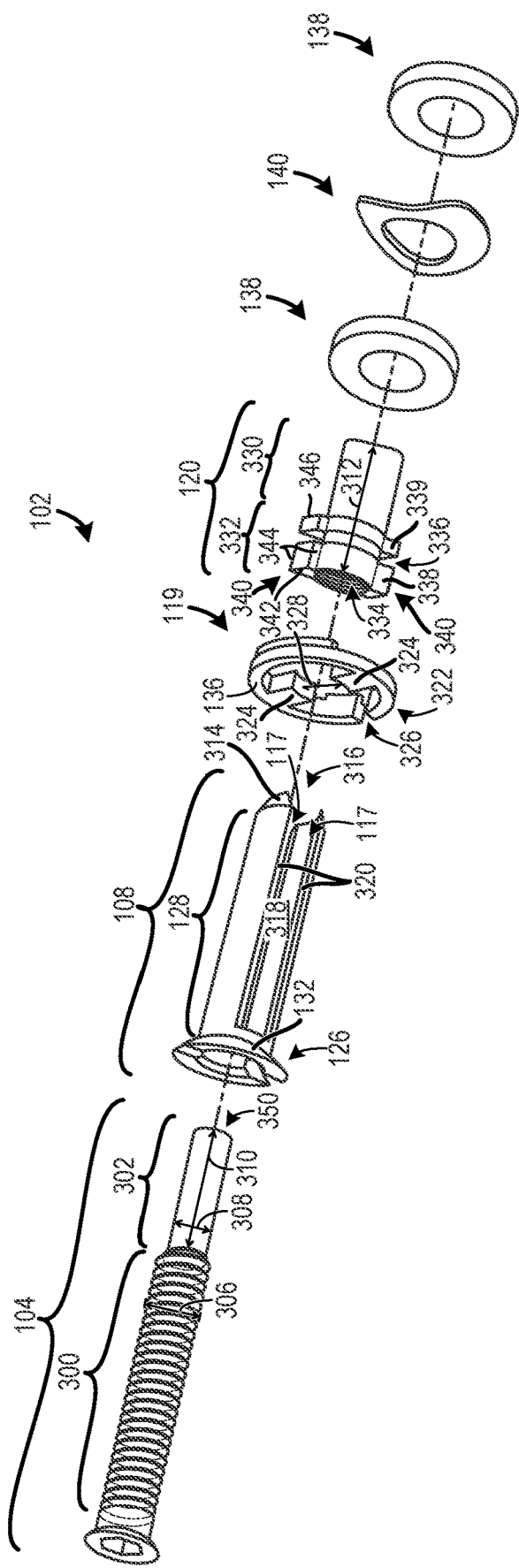
FIG. 3 shows an exploded view of the fastener system, shown in FIG. 1.
Figure 4:
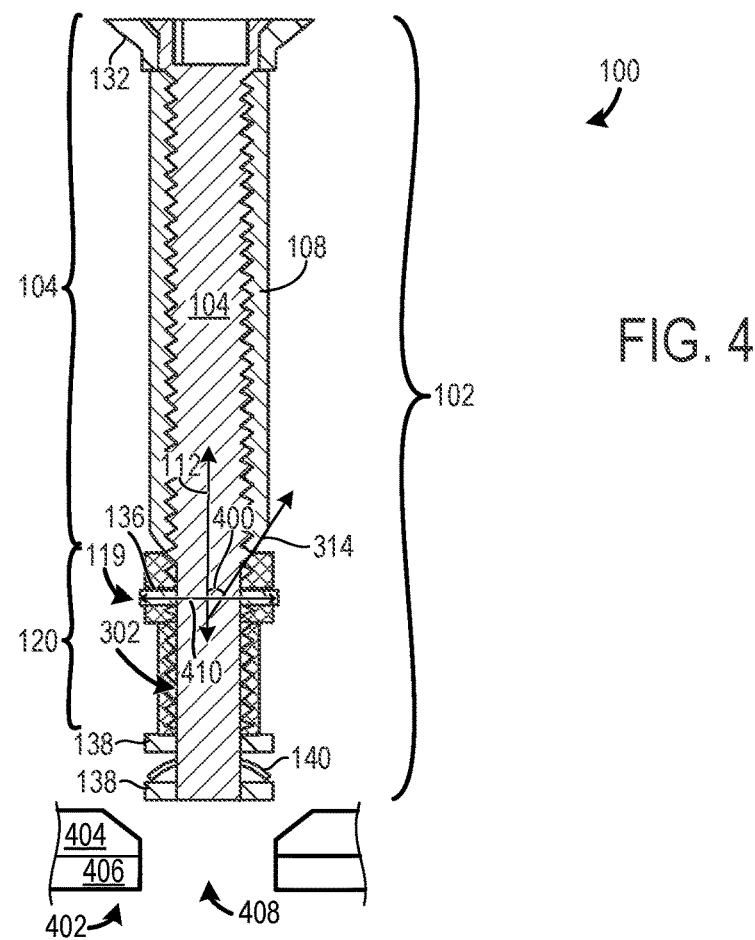
FIG. 4 shows the fastener system, illustrated in FIG. 1, in an installation configuration.
Figure 5:
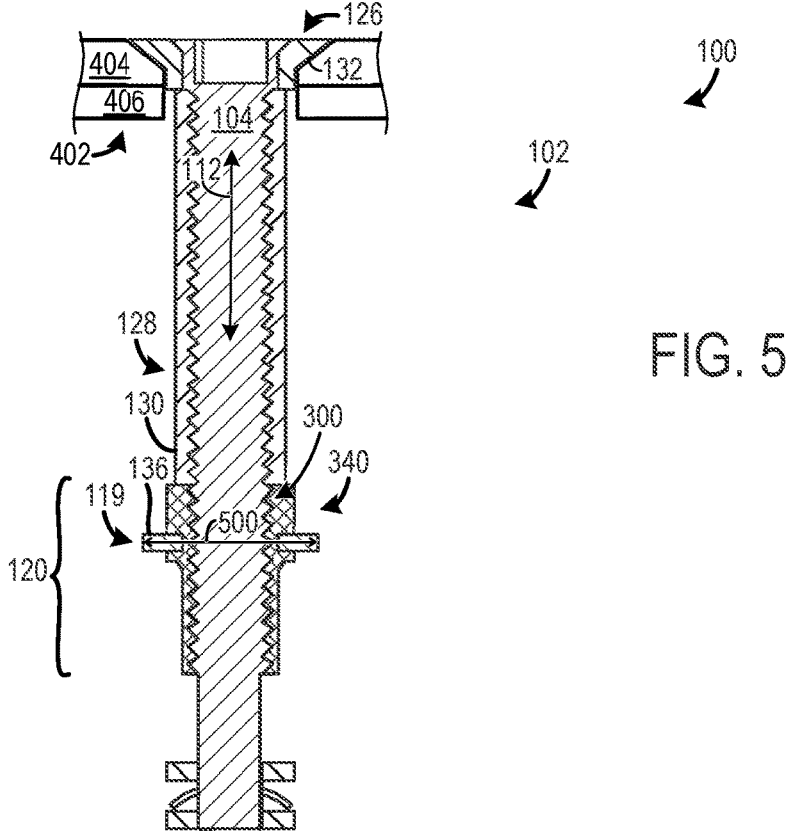
FIG. 5 shows the fastener system, illustrated in FIG. 1, in a first clamping configuration.
Figure 6:
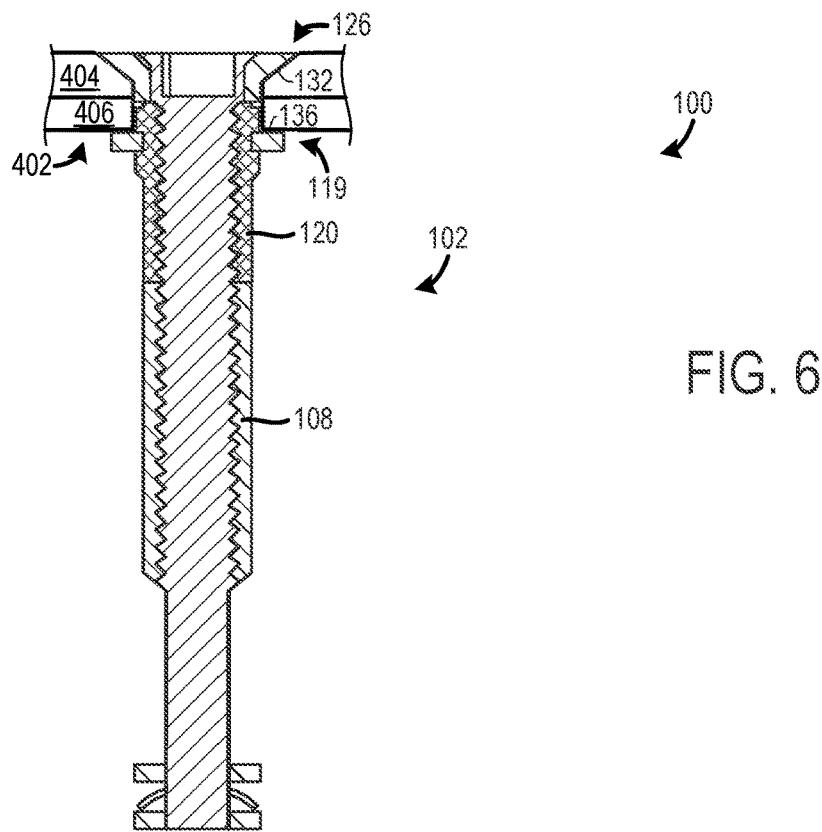
FIG. 6 shows the fastener system, illustrated in FIG. 1, in a second clamping configuration.
Figure 7:
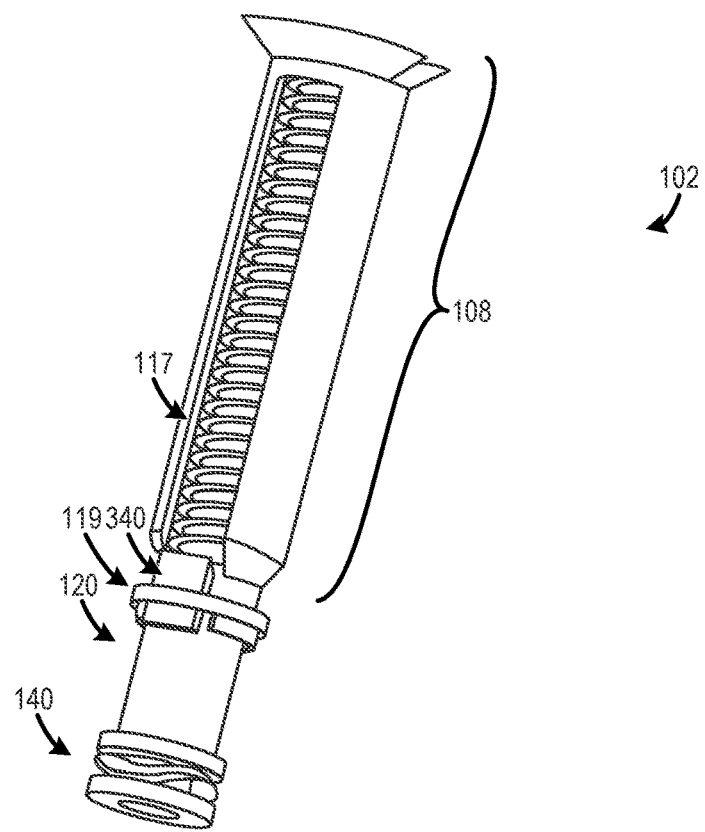
FIGS. 7-9 show perspective views of the operational sequence of the fastener, shown in FIGS. 4-6.
Figure 8:
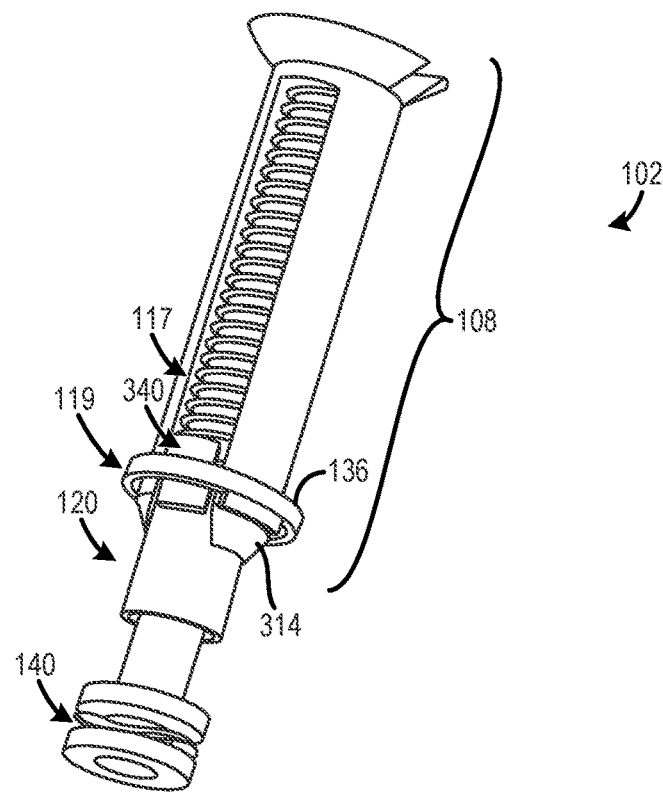
Figure 9:
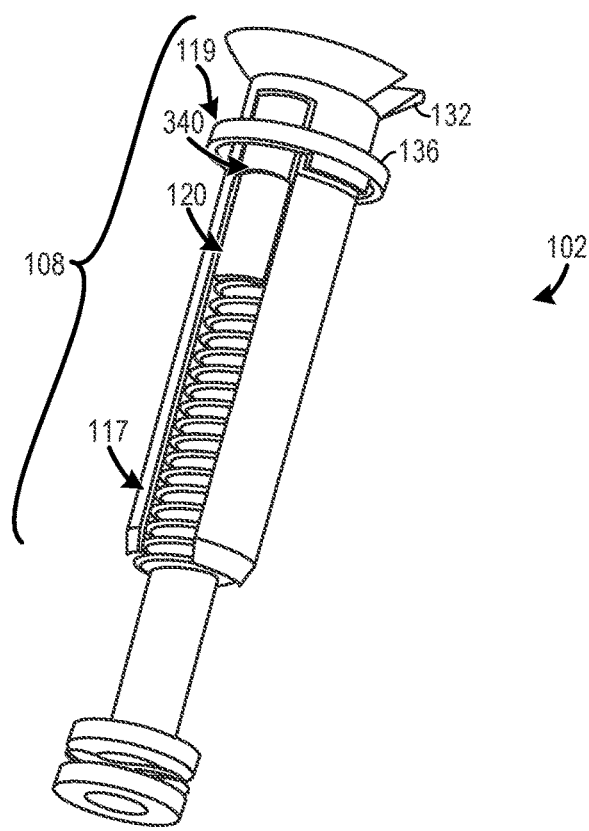
Figure 10:
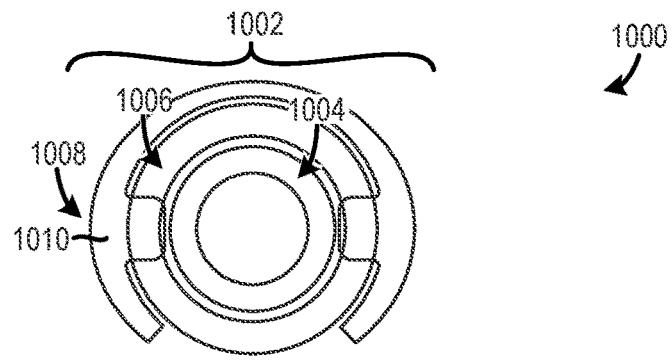
FIG. 10 shows a top view of another example of a fastener system.
Figure 11:
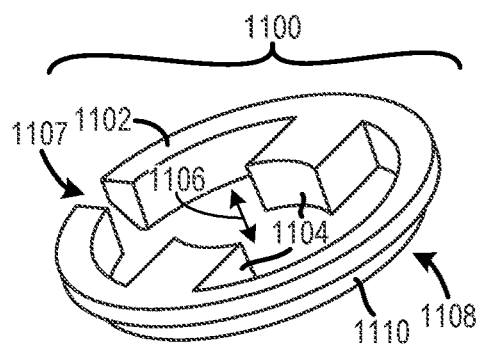
FIG. 11 shows a perspective view of a second example of an expandable ring that may be included in the fastener system.
Figure 12:
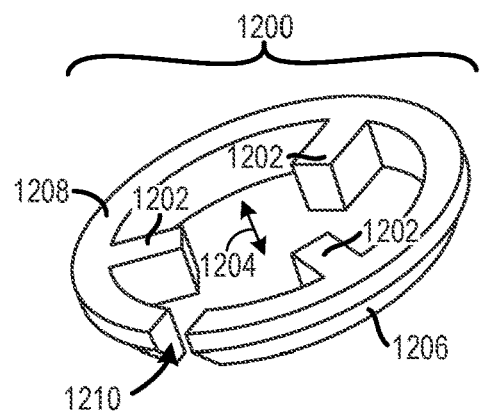
FIG. 12 shows a perspective view of a third example of an expandable ring that may be included in the fastener system.
Figure 13:
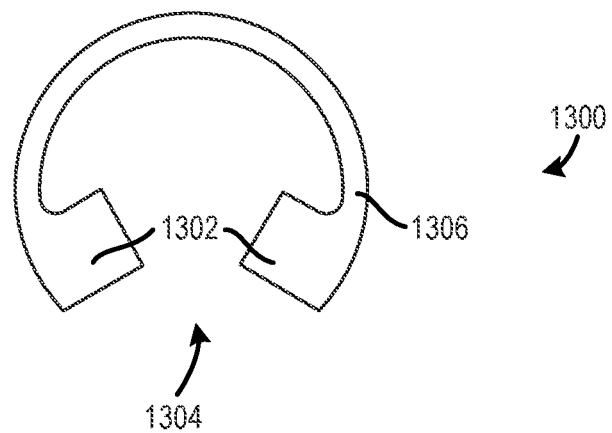
FIG. 13 shows a fourth example of an expandable ring that may be included in the fastener system.
Figure 14:
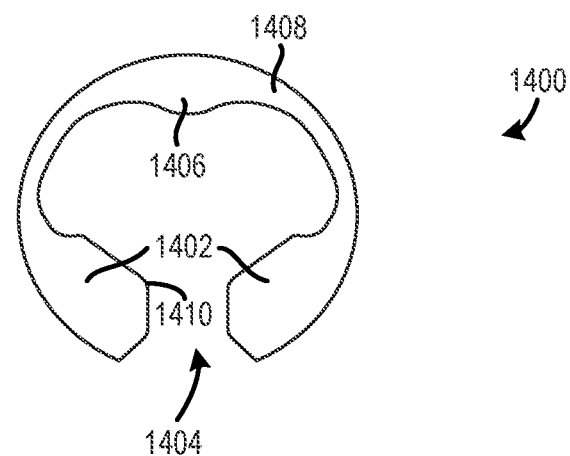
FIG. 14 shows a fifth example of an expandable ring that may be included in the fastener system.
Figure 15:
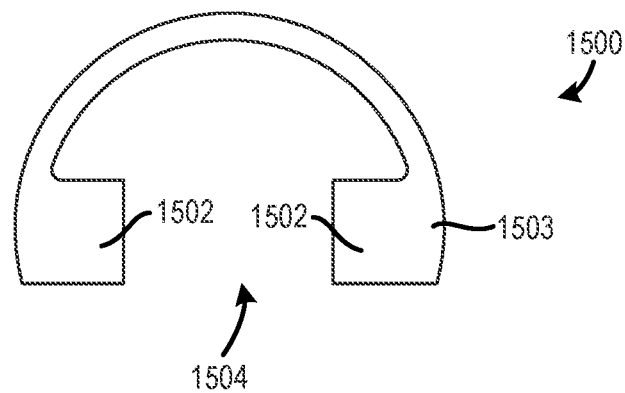
FIG. 15 shows a sixth example of an expandable ring that may be included in the fastener system.

FIG. 1 shows a perspective view a fastener system and FIG. 2 shows a top view of the fastener system. FIG. 3 shows an exploded view of the fastener system, shown in FIG. 1. FIGS. 4-6 illustrate a clamping operation sequence in the fastener system shown in FIG. 1. FIGS. 7-9 show a perspective view of the operation sequence, shown in FIGS. 4-6. FIG. 10 shows a top view of a second example of a fastener system. FIG. 11 shows a second example of an expandable ring for a fastener system and FIG. 12 shows a third example of an expandable ring for a fastener system. FIGS. 13-15 show additional examples of expandable rings that may be included in the fastener system. FIG. 16 shows a method for clamping and unclamping a fastener system. FIG. 17 shows another method for operation of a fastener system.

Turning to FIG. 1 depicting a fastener system 100 including a fastener 102. It will be appreciated that in some examples the fastener system 100 may further include a workpiece including multiple sections with holes therein, discussed in greater detail herein. The workpiece may be interior aircraft panels, such as floor panels, in one example. Thus, the fastener may be an aerospace fastener.

The fastener 102 includes a spindle bolt 104 with a head 105 having a tooling interface 106. In the illustrated example, the tooling interface 106 is a hexagonal recess. However, numerous suitable tooling interfaces have been contemplated such as a splined recess, slotted recess (e.g., a Phillips type recess), square recess, external spine or hex for use with conventional sockets, etc.

The fastener 102 in FIG. 1 also includes a bolt body 108. The bolt body 108 includes a body tooling interface 110. In the illustrated example, the body tooling interface 110 is embodied as slotted recesses. However, other suitable tool interfaces may be used such as splines, external spines or hex, a Phillips type recess, etc.

Tooling devices may be mated with the tooling interface 106 in the spindle bolt 104 and the body tooling interface 110 to enable rotation of the spindle bolt while the bolt body 108 is held stationary. Rotation of the spindle bolt 104 in opposing directions about a central axis 112 causes clamping and unclamping action in the fastener 102, described in detail herein. For instance, clockwise rotation of the spindle bolt 104 may initiate clamping operation in the fastener 102 and counterclockwise rotation of the spindle bolt may initiate unclamping operation in the fastener or vice versa. As discussed herein, an upward direction refers to a direction parallel to the central axis 112 extending toward a crown 126 of the bolt body 108. On the other hand, a downward direction refers to a direction parallel to the central axis 112 extending toward an end 113 of the spindle bolt 104. In one example, the central axis 112 may be parallel to a gravitational axis. However, in other examples, the central axis 112 may not be parallel to a gravitational axis. In either case, the relative directions, upward and downward, retain the general directional definition provided above.

FIG. 1 also shows an automated tooling apparatus 114 that may be used to manipulate the fastener system 100 and carry out the methods described herein. Specifically, the automated tooling apparatus 114 may include automated tooling devices designed to mate with the tooling interface 106 in the spindle bolt 104 and the body tooling interface 110. Further, in one example, the tooling apparatus 114 may be included in the fastener system 100 or in other examples the tooling apparatus may be omitted from the system. The tooling apparatus 114 may include a processor 116 and memory 118 (e.g., non-transitory memory) storing instructions executable by the processor. Although the automated tooling apparatus 114 is schematically illustrated, it will be appreciated that the automated tooling apparatus may further include tooling attachments (e.g., hex heads, sockets, etc.,) arms, carriages, actuators, etc., for manipulating the fastener system 100. Specifically in one example, the tooling apparatus 114 may include an arm with a tooling attachment such as a hex head, socket, etc., that extends to the fastener 102. However, additionally or alternatively, manual tooling may be carried out via installation personnel during installation and removal of the fastener.

The bolt body 108 includes anti-rotation slots 117. Specifically, in the illustrated example, the bolt body 108 includes two anti-rotation slots positioned on opposing sides of the bolt body. However, in other examples, the bolt body 108 may include one anti-rotation slot or three or more anti-rotation slots and/or the anti-rotation slots may have a different spacing. The number of anti-rotation slots may correspond to the number of tangs in an expandable ring 119 in the fastener 102 and/or the number of anti-rotation extensions in a nut 120.

The anti-rotation slots 117 extend (e.g., radially extend) through a wall 122 of the bolt body 108 and axially extend from an end 124 of the bolt body 108 to the crown 126 of the bolt body 108. Providing anti-rotation slots that axially extend down the bolt body enable the grip range of the fastener to be increased. However, in other examples, the anti-rotation slots 117 may only axially extend up a portion of a shank 128 of the bolt body 108. The bolt body 108 is also shown including an outer surface 130 of the shank 128.

The crown 126 of the bolt body 108 includes an upper clamping surface 132 and a top surface 134. In the illustrated example, the top surface 134 is planar and intersects the upper clamping surface 132. In this way, the compactness of the fastener may be increased when compared to fasteners having collet bodies with crowns having greater axial lengths. However, other profiles of the crown may be used, in other examples.

The expandable ring 119 is mated with the nut 120, in the illustrated example. Furthermore, the expandable ring 119 radially expands and retracts when the fastener 102 is transitioned between an installation configuration and a clamping configuration or vice versa. The fastener 102 is in an installation configuration in FIG. 1. In the installation configuration, the outer diameter of the expandable ring 119 may be less than the outer diameter of the expandable ring in the clamping configuration to enable the fastener to be inserted into openings in sections of a workpiece. Thus, in the installation configuration at least a portion of a lower clamping surface 136 of the expandable ring 119 does not radially extend beyond the outer surface 130 of the shank 128 of the bolt body 108. However, in other examples, in the installation configuration the entire lower clamping surface 136 may not radially extend beyond the shank's outer surface 130.

The fastener 102 is also shown including washers 138 and a spring 140 coupled to the spindle bolt 104. Specifically, in the illustrated example, the spring is positioned axially between two washers. However, in other examples, the spindle bolt may include a radially aligned protrusion similar to the washers and therefore the fastener may include one washer and spring, in such an example. The washers 138 and spring 140 may exert an axial force on the nut 120 when the fastener is in the installation configuration to allow the nut 120 to be aligned in a desired manner with the anti-rotation slots 117 as well as allow threading engagement to be initiated between the nut and the spindle bolt when transitioning to the clamping configuration. In another example, the fastener 102 may include the spring and not the washer. Additionally, in the illustrated example, the spring 140 is embodied as a spring washer. However, other suitable springs may be used in other examples such as helical springs, elastomers, slotted bushing springs, combinations thereof, etc.

The fastener 102 may be constructed out of a variety of materials such as metal (steel, titanium, aluminum, etc.), plastics, composites, combinations thereof, etc. Additionally, the fastener parts may be constructed out of a similar material, in one example. However, in other examples, some of the fastener parts may be constructed out of different materials. For instance, the bolt body may be constructed out of aluminum while the expandable ring may be constructed out of a more compliant metal such as steel to accommodate flexion of the ring. However, numerous material construction combinations in the fastener have been contemplated.

FIG. 2 shows a top view of the fastener 102. The tooling interface 106 of the spindle bolt 104 and the body tooling interface 110 of the bolt body 108 are again shown. The body tooling interface 110 includes slots 200 that aligned along a common axis 202. However, numerous suitable body tooling interface profiles have been contemplated, as previously discussed. Cutting plane 204 indicates the cross-sectional views shown in FIGS. 4-6. The spindle bolt 104 may be rotated in a first direction 206 about the central axis 112 to thread into the nut 120, shown in FIG. 1, to decrease the distance between the upper clamping surface 132 and the lower clamping surface 136. On the other hand, the spindle bolt 104 may be rotated in a second direction 208 opposing the first direction to unthread the bolt from the nut 120 to increase a distance between the upper clamping surface and the lower clamping surface. It will be appreciated that the threading/unthreading directions may be reversed, in other examples.

FIG. 3 shows an exploded view of the fastener 102. Again, the spindle bolt 104, bolt body 108, expandable ring 119, nut 120, washers 138, and spring 140, are illustrated.

The spindle bolt 104 includes a threaded section 300 and an unthreaded section 302 below the threaded section. The threaded section 300 has an outer diameter 306 that is larger than an outer diameter 308 of the unthreaded section 302, in the illustrated example. Furthermore, an axial length 310 of the unthreaded section 302 may be equal to or greater than an axial length 312 of the nut 120 to allow the nut to enclose the unthreaded section while it is threadingly disengaged from the threaded section 300 of the spindle bolt 104 in an installation configuration.

The bolt body 108 is shown including the anti-rotation slots 117, crown 126, shank 128 extending from the crown, and a ramp 314 at an end 316 spaced away from the crown. The ramp 314 tapers in an axial direction extending away from the crown 126. The ramp 314 may interact with the expandable ring 119 to increase the diameter of the ring and place the ring in a clamping configuration. By including an expandable ring and ramp with this expansion/retraction functionality, the axial length of the fastener may be decreased while retaining a desired grip length variance when compared to prior fasteners, which include legs requiring greater lengths to accommodate leg flexion.

The crown 126 is again shown including the upper clamping surface 132. The bolt body 108 also includes an interior cavity 318 in which a portion of the spindle bolt 104 may be positioned when the fastener 102 is assembled.

The anti-rotation slots 117 axially extend from the end 316 of the bolt body 108 spaced away from the crown 126 to the upper clamping surface 132. Additionally, the anti-rotation slots 117 includes sidewalls 320. In the illustrated example, the sidewalls 320 are parallel to one another. However, other sidewall profiles may be used, in other examples.

The expandable ring 119 includes an outer section 322 including the lower clamping surface 136. Tangs 324 extend radially inward from the outer section 322. As discussed herein inward refers to a direction extending toward the central axis and outward refers to a direction extending away from the central axis. The expandable ring 119 further includes an expansion slot 326 accommodating radial expansion of the expandable ring 119 when transitioned to a clamping configuration. Thus, the size of the expansion slot 326 increases when the ring 119 is expanded. Thus, the expandable ring 119 may be loaded when expanded from a neutral position. The profile of the ring may be tuned to achieve a desired spring rate. It will be appreciated that the spring rate may be chosen based on end-use objectives.

When the expandable ring is in a neutral configuration, an inner diameter 328 of the tangs 324 may be equal to or greater than the diameter 308 of the unthreaded section 302 of the spindle bolt 104. Therefore, the expandable ring 119 may be in neutral (e.g., unloaded configuration) when the ring is in an installation configuration where the ring at least partially circumferentially surrounds the unthreaded section. However, in other examples, the expandable ring 119 may be at least partially expanded when in the installation configuration. Additionally, in the ring's neutral configuration the inner diameter 328 of the tangs 324 may be less than the outer diameter 306 of the threaded section 300 of the spindle bolt 104. In this way, when the expandable ring 119 is moved upward during actuation, the threads function to pre-expand the ring prior to expansion via the ramp 314. Thus, the expandable ring 119 may be expanded to ride on the crests of the threaded section 300. As such, ring expansion may be gradually implemented, allowing for less abrupt ring expansion, if desired. In this way, the fastener may be smoothly transitioned between configurations to reduce fastener wear. However, in other examples, the inner diameter of the tangs 324 may be greater than the outer diameter of the threaded section 300 of the spindle bolt 104.

Additionally, when the expandable ring 119 is in the neutral configuration the inner diameter 328 of the tangs 324 may be less than an inner diameter of the end 316 of the bolt body 108 where the ramp 314 is located. In this way, the ramp 314 may further expand and load the expandable ring 119 when the ring is moved upward across the ramp. In other words, the expandable ring's inner diameter is expanded by riding on the ramp of the bolt body.

The nut 120 includes a lower section 330, an upper section 332, and an interior threaded section 334. The interior threaded section 334 is designed to threadingly engage with the threaded section 300 of the spindle bolt 104. For instance, a pitch and diameter of the threads in the interior threaded section 334 and the threaded section 300 of the spindle bolt 104 may complement one another. The upper section 332 includes a gap 336 axially positioned between upper sections 338 and lower sections 339 of anti-rotation extensions 340. It will be appreciated that the expandable ring 119 mates with the gap 336 when the fastener 102 is assembled. In this way, the expandable ring 119 may be axially delimited by the gap 336 in the nut 120. Specifically, the upper and lower sections 338 and 339 may axially restrict the relative movement between the expandable ring 119 and the nut 120 and enable axial movement of the nut 120 to cause axial movement of the expandable ring. Thus, it will be appreciated that the nut 120 and the expandable ring 119 may move axially in unison during fastener actuation. This type of interaction between the expandable ring 119 and the nut 120 may enable the structural integrity of the fastener to be increased and specifically may enable the load-carrying capabilities of the fastener to be increased.

Additionally when the expandable ring 119 is mated with the nut 120, the tangs 324 extend into openings (e.g., radially aligned openings) in the nut 120. These openings may extend inward from sections of the gap 336. In this way, the nut 120 and the expandable ring 119 may be coupled such that rotation between the two components is restricted (e.g., prevented). The nut 120 also includes anti-rotation extensions 340 mating with the anti-rotation slots 117 during clamping and unclamping of the fastener 102. Specifically, the anti-rotation extensions 340 and the anti-rotation slots 117 may interact to guide the nut 120 in opposing axial directions while restricting (e.g., preventing) rotation between the nut 120 and the bolt body 108. The anti-rotation extensions 340 each include a top wall 342, two sidewalls 344, and a lower wall 346. In the illustrated example, the sidewalls 344 are parallel to one another. However, in other examples, other sidewall contours may be used. Additionally, there are two anti-rotation extensions 340, in the example illustrated in FIG. 3. However, in other examples, the nut may include an alternate number of anti-rotation extensions. For instance, the nut may include a single anti-rotation extension or three or more anti-rotation extensions. Moreover, the number of anti-rotation extensions may correspond to the number of anti-rotation slots in the bolt body. However, in other instances, the number of anti-rotation extensions may not be equivalent to the number of anti-rotation slots.

The washer 138 and the spring 140 are again shown in FIG. 3. When assembled, the washer 138 and the spring may be coupled (e.g., press fit, welded, etc.,) to an end 350 of the unthreaded section 302 of the spindle bolt 104.

FIGS. 4-6 show an operational sequence for the fastener system 100 including the fastener 102. Specifically, FIG. 4 shows the fastener 102 in an installation configuration and FIGS. 5 and 6 depict the fastener in different clamping configurations.

Referring to FIG. 4, the fastener 102 is shown in the installation configuration where the nut 120 is positioned below the ramp 314 in the bolt body 108. In the installation configuration, the nut 120 and the expandable ring 119, correspondingly, are positioned below the ramp 314. As previously discussed, the ramp 314 causes outward expansion of the expandable ring 119 as the ring ascends the ramp. An angle 400 is formed between the ramp 314 and the central axis 112 of the fastener 102. The angle 400 may be a non-perpendicular angle such as 30°, 45°, 60°, 70°, etc. Moreover, the ramp 314 may have a concave or convex contour, in other examples, to enable smooth interaction between the ring and the ramp.

Additionally, in the installation configuration the nut 120 may not be threadingly engaged with the spindle bolt 104 but rather is positioned such that the nut circumferentially surrounds a portion of the unthreaded section 302 of the spindle bolt 104. Thus, the spindle bolt 104 may freely spin when rotated in an unthreading direction about the central axis 112. In this way, the likelihood of unwanted tool lock-up during removal of the fastener 102 may be reduced (e.g., avoided), thereby increasing tooling efficiency. Furthermore, the lower clamping surface 136 in the expandable ring 119 is retracted such that the fastener may be inserted through openings in sections of a workpiece 402. The workpiece 402, in one example, may be interior aircraft panels, such as floor panels.

Specifically, the workpiece 402 includes a first section 404 and a second section 406. The workpiece 402 may be included in the fastener system 100 in one example or omitted from the system, in other examples. The first and second sections 404 and 406 include openings 408 that allow the fastener 102 to be inserted there through. In the illustrated example, the opening in the first section 404 has a profile enabling the upper clamping surface 132 to mate therein. Thus, the opening in the first section 404 is angled similarly to the upper clamping surface 132. It will be appreciated that the fastener 102 may be accessed during tooling only from a top side of the workpiece 402, in one example. In this way, the fastener 102 can be used in installation environments where blind fastening is desired, or in some cases required, thereby increasing fastener adaptability. FIG. 4 also shows an outer diameter 410 of the expandable ring 119.

Turning to FIG. 5 showing the fastener 102 in a clamping configuration where the fastener has been inserted into the workpiece 402. It will be appreciated that rotating the spindle bolt 104 in a threading direction about the central axis 112 threads the bolt into the nut 120 thereby moving the nut upward toward the crown 126 of the bolt body 108. As such, the spindle bolt 104 may be rotated in the threading direction to place the fastener 102 in the clamping configuration, shown in FIG. 5. As the nut 120 and expandable ring 119 move upward the anti-rotation slots 117 interact with the anti-rotation extensions 340 in the nut to guide the nut and the ring axially upward while limiting (e.g., preventing) rotation between the bolt body 108 and the nut 120.

As the expandable ring 119 is moved upward, the threaded section 300 of the spindle bolt 104 may interact with the ring to pre-expand the ring. After the interaction between the ring and the threaded portion of the spindle bolt 104, the ring 119 may interact with the ramp 314, shown in FIG. 4, as the ring is moved upward.

The interaction between the ramp 314, shown in FIG. 4, and the expandable ring 119 induces ring expansion as the ring and nut 120 are moved upward. Therefore, in the clamping configuration, shown in FIG. 5, the expandable ring 119 is expanded such that the lower clamping surface 136 extends beyond the outer surface 130 of the bolt body shank 128. Therefore, an outer diameter 500 of the expandable ring 119, shown in FIG. 5, is greater than the outer diameter 410 of the expandable ring 119, shown in FIG. 4. Furthermore, in the clamping configuration the expandable ring 119 is positioned axially above the ramp 314.

In the clamping configuration of the fastener 102, shown in FIG. 5, the fastener's grip length may be at a maximum value. The grip length may be the axial distance between the upper clamping surface 132 and the lower clamping surface 136. In this way, the fastener 102 may clamp workpieces with larger thicknesses. However, the workpiece shown in FIG. 5 has a thickness that is less than the fastener's largest grip length.

FIG. 6 shows the fastener 102 in another clamping configuration. In the clamping configuration shown in FIG. 6, the grip length of the fastener may be at a minimum value. As previously, discussed the spindle bolt 104 may be rotated in a threading direction about the central axis 112 to move the nut 120 upward toward the crown 126 of the bolt body 108 and into the clamping configuration depicted in FIG. 6.

As shown, in FIG. 6 the upper clamping surface 132 and the lower clamping surface 136 exert a clamping force on the workpiece 402 to clamp the first section 404 and the second section 406 of the workpiece together. In this way, the expandable ring 119 clamps up against an underside of the workpiece 402. It will be appreciated that the fastener may clamp workpieces with thicknesses anywhere between the grip length of the fastener 102, shown in FIG. 6, and the grip length of the fastener, shown in FIG. 5. In this way, the fastener 102 may be used in a wide variety of installation scenarios.

FIGS. 7-9 show a perspective view of the fastener system 100 and fastener 102 during the clamping operational sequence. Specifically, FIG. 7 shows the fastener 102 in an installation configuration and FIGS. 8 and 9 again show the fastener 102 in clamping configurations.

FIG. 7 shows the anti-rotation extensions 340 in the nut 120 in alignment with the anti-rotation slots 117 in the bolt body 108 and positioned axially below the bolt body 108. As previously, discussed the spring 140 may exert an upward axial force on the nut to maintain the alignment between the anti-rotation extensions 340 and the anti-rotation slots 117 in the installation configuration.

FIG. 8 shows fastener 102 in a clamping configuration where the anti-rotation extensions 340 in the nut 120 are moved further upward with regard to the anti-rotation slots 117 in the bolt body 108. As previously discussed, the expansion ring's interaction with the threaded section 300 of the spindle bolt 104 and the ramp 314 in the bolt body 108 serve to expand the ring 119, allowing the clamping surface 136 in the ring to increase in diameter.

FIG. 9 shows the fastener 102 in another clamping configuration where the anti-rotation extensions 340 in the nut 120 are moved even further upward with regard to the anti-rotation slots 117 in the bolt body 108. As such, the upper clamping surface 132 and the lower clamping surface 136 in the ring 119 are moved closer to one another. In this way, the fastener 102 may clamp workpieces with smaller thicknesses.

FIG. 10 shows a second example of a fastener system 1000 including a fastener 1002. The fastener system 1000 and fastener 1002, shown in FIG. 10, may share common features, structural characteristics, functional characteristics, etc., with the fastener system 100 and the fastener 102, shown in FIGS. 1-9. Therefore, redundant description is omitted.

The fastener 1002 is shown including a spindle bolt 1004, a bolt body 1006, and an expandable ring 1008. The expandable ring 1008 is shown including a clamping surface 1010. The clamping surface has an oval type profile, in the example illustrated in FIG. 10, as opposed to the round profile in the fastener shown in FIGS. 1-9. Other profiles of the clamping surface have been contemplated such as rectangular, square, etc.

FIG. 11 shows another example of an expandable ring 1100 in an unloaded configuration. It will be appreciated that the expandable ring 1100 may be included in any of the fasteners described herein, such as the fastener 102, shown in FIGS. 1-9. The expandable ring 1100 is shown including a clamping surface 1102 and two tangs 1104 that extend radially inward toward a central axis 1106. The tangs 1104 are spaced 180° apart with regard to the central axis 1106. In this way, the tangs may increase the uniformity of expansion of the ring. It will be appreciated that the expansion slots may be correspondingly positioned on opposing sides of the bolt body with 180° separation. However, other tang positions have been contemplated. An expansion slot 1107 of the expandable ring 1100 accommodating radial expansion of the ring is also illustrated in FIG. 11.

Furthermore, the expandable ring 1100 is shown including a tapered section 1108 that tapers inward toward the central axis 1106. Specifically, the tapered section 1108 includes an outer surface 1110 that extends towards the central axis 1106 in a downward direction. The tapered section may provide less hoop resistance and increased load-carrying capabilities. In this way, the clamping force provided by the fastener may be increased, if desired. Furthermore, it will be appreciated that the profile of sections of the expandable ring 1100 below the clamping surface 1102 may be tuned to achieve desired ring flexibility, load carrying capacity, structural integrity, etc. For instance, it may be desirable in some applications to decrease the spring rate of the expandable ring to decrease the torque input needed to clamp and unclamp the fastener. However, in other applications, such as when increased load carrying capacity is an objective, the spring rate of the expandable ring may be increased.

FIG. 12 shows yet another example of an expandable ring 1200. It will be appreciated that the expandable ring 1200 may be included in any of the fasteners described herein, such as the fastener 102, shown in FIGS. 1-9. The expandable ring 1200 includes three tangs 1202, in the illustrated example. The three tangs 1202 are equally spaced (e.g., sequentially positioned at 120° increments) around the ring with regard to the central axis 1204. However, other tang arrangements have been contemplated. To accommodate the three tangs the bolt body of the fastener may include three corresponding anti-rotation slots, in one example. Adding additional tangs to the expandable ring may allow for more uniform ring expansion.

The expandable ring 1200 again includes a tapered section 1206 that tapers inwardly toward the central axis 1204. As previously discussed, the tapered section 1206 provides less hoop resistance and increased load-carrying capabilities. A clamping surface 1208 and an expansion slot 1210 in the expandable ring 1200 are also shown in FIG. 12. It will be appreciated that in other examples, the expandable ring may include four or more tangs.

FIG. 13 shows another example of an expandable ring 1300. The expandable ring 1300 may be included in any of the fasteners described herein. The expandable ring 1300 includes two tangs 1302 and an expansion slot 1304 positioned between the tangs. The expansion slot 1304 is larger than the other ring slots illustrated herein. The increase in the slot size allows for greater flexion of the ring, thereby decreasing the force needed to expand the ring. As such, fastener actuation may require less torque input, if desired, thereby increasing installation efficiency. Additionally, the tangs 1302 extend radially inward from a clamping surface 1306.

FIG. 14 shows another example of an expandable ring 1400. The expandable ring 1400 may be included in any of the fasteners described herein. The expandable ring 1400 includes two tangs 1402 and an expansion slot 1404 positioned between the tangs. The expandable ring 1400 also includes a protrusion 1406 extending radially inward from a clamping surface 1408. The protrusion may serve to increase the spring rate of the expandable ring 1400. As such, in the expanded configuration the ring may be more securely seated on the exterior surface of the bolt body when in a clamping configuration. The tangs 1402 include curved interior surfaces 1410, which may decrease friction between the spindle bolt and the ring when the ring is expanded and retracted. In this way, the ring may smoothly expand and retract. The tangs 1402 again extend inward from the clamping surface 1408.

FIG. 15 shows another example of an expandable ring 1500. The expandable ring 1500 may be included in any of the fasteners described herein. The expandable ring 1500 again includes tangs 1502 extending inward from a clamping surface 1503. The tangs 1502 are positioned on radially opposing sides of the ring. Thus, the tangs 1502 are positioned with 180° separation. The expandable ring 1500 also includes an expansion slot 1504 positioned between the tangs 1502. The expansion slot 1504 has a larger size than the other expansion slots illustrated herein, which again provides greater ring flexion. FIGS. 13-15 illustrate different ring profile variants enabling ring flexion, clamping surface profile, and/or the structural integrity of the ring to be tuned to match end-use design goals.

FIGS. 1-15 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. In another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 16 shows a method 1600 for operation of a fastener system. The method 1600 as well as the other methods described herein may be implemented by the fastener systems and corresponding components, described above with regard to FIGS. 1-15 or may be implemented by other suitable fastener systems. Furthermore, the methods described herein may be implemented at least partially via automated tooling device and/or may be implemented via manually controlled tooling devices. Therefore, at least a portion of the steps in the methods may be stored as instructions in memory executable by a processor.

Steps 1602 and 1604 are implemented to transition the fastener from an installation configuration to a clamping configuration. Conversely, steps 1606 and 1608 are implemented to transition the fastener from the clamping configuration to the installation configuration.

At 1602, the method includes threading a spindle bolt into a nut to decrease an axial distance between an upper clamping surface in a bolt body and a lower clamping surface in an expandable ring, where an anti-rotation extension in the nut mates with an anti-rotation slot in the spindle body. Next at 1604, the method includes increasing a diameter of the expandable ring through interaction between a ramp in the bolt body spaced away from the upper clamping surface and a surface of the expandable ring. It will be appreciated that after the expandable ring is moved upward past the ramp, the lower clamping surface extends beyond the outer surface of the bolt body to allow the fastener to clamp a workpiece. In one example, the workpiece may be interior aircraft panels, such as floor panels, and the fastener may be tooled via an automated tooling arm with tooling attachments.

At 1606, the method includes unthreading the spindle bolt from the nut to increase the axial distance between the upper clamping surface and the lower clamping surface. At 1608, the method includes decreasing the diameter of the expandable ring. In this way, the clamping surface may be retracted to enable the fastener to be removed from holes in a workpiece or in the case of installation inserted into holes in the workpiece. Method 1600 enables the fastener to be quickly and efficiently transitioned between the clamping and installation configurations. As a result, installation efficiency of the fastener is increased.

FIG. 17 shows a detailed method 1700 for transitioning the fastener into a clamping configuration from an installation configuration. At 1702, the method includes rotating the spindle bolt while the fastener body is kept stationary. It will be appreciated that the tooling interfaces in the spindle bolt and the fastener body may be actuated by tooling devices (e.g., automated tooling devices) to enable spindle bolt rotation. As such, manual and/or automated spindle bolt and fastener body tooling have been contemplated.

At 1704, the method includes pushing the nut toward the spindle bolt via the spring. Specifically, the nut may be pushed towards leading threads in the spindle bolt. It will be appreciated that the spring's interaction with the spindle bolt may enable alignment to be sustained between the nut anti-rotation extensions and the bolt body anti-rotation slots when the fastener is in an installation configuration. In this way, the fastener may retain desired alignment during the installation configuration.

Next, at 1706, the method includes engaging the nut with the spindle threads. Specifically, an interior threaded section of the nut may threadingly engage with a threaded section of the spindle bolt.

At 1708, the method includes preventing rotation of the nut through interaction between the nut anti-rotation extensions and the bolt body anti-rotation slots. It will be appreciated that the mating between the extensions and the slots enables the nut to axially traverse the bolt body while restricting (e.g., preventing) rotation of the nut.

Next, at 1710, the method includes pre-expanding the expandable ring when the spindle threads push on the tangs of the ring. In this way, the expandable ring may be gradually expanded to enable the fastener to smoothly transition into the clamping configuration.

At 1712, the method includes further expanding the expandable ring through the interaction between the ramp in the bolt body and the ring. Specifically, a tapered surface of the ramp pushes the ring radially outward as the ring travels up the bolt body. In this way, the ring may be smoothly moved into a clamping configuration.

Next, at 1714, the method includes seating the expandable ring onto a shank of the bolt body above the ramp. In this way, the fastener is placed in a clamping configuration where the clamping surface in the expandable ring is positioned radial outward from an outer surface of the bolt body.

Method 1700 enables the fastener to be efficiently transitioned from an installation configuration into a clamping configuration. Furthermore, the expanding action of the clamping ring enables the fastener to achieve increased grip length variance while retaining fastener compactness. It will be appreciated that method 1700 may be implemented after the fastener is inserted into openings in sections of a workpiece.

The technical effect of the fastener systems and corresponding methods described herein is to provide increased grip length variance through the use of an expandable ring interacting with a ramp in a bolt body. Additionally, the interaction between the expandable ring, the nut, and the bolt body enables the structural integrity of the fastener to be increased. Additionally, the decreased profile of the fastener, specifically with regard to the head of the spindle bolt and crown of the bolt body, enables the fastener to be more efficiently tooled.

The invention will further be described in the following paragraphs. In one aspect, a fastener system is provided that includes a spindle bolt having a threaded section and a tooling interface at a head, a bolt body at least partially mated with the spindle bolt, including an anti-rotation slot and an outer surface, a nut including an interior threaded portion and an anti-rotation extension, and an expandable ring mated with the nut and including a lower clamping surface, where, in a clamping configuration, the lower clamping surface extends beyond the outer surface of the bolt body, the interior threaded portion of the nut is threadingly engaged with the threaded section of the spindle bolt, and the anti-rotation extension mates with the anti-rotation slot, and where, in an installation configuration, an outer diameter of the lower clamping surface is less than an outer diameter of the lower clamping surface in the clamping configuration.

In another aspect, a fastener system is provided that includes a spindle bolt having a threaded section and a tooling interface at a head, a bolt body at least partially mated with the spindle bolt, including an anti-rotation slot, an outer surface, an upper clamping surface, and a ramp at an end of the bolt body spaced away from the upper clamping surface, a nut including an interior threaded portion, and an expandable ring mated with the nut and including a lower clamping surface, where, when transitioning to a clamping configuration, the ramp interacts with the expandable ring to radially expand the expandable ring when the spindle bolt is threaded into the nut to place the fastener system in the clamping configuration where the lower clamping surface extends beyond the outer surface of the bolt body.

In another aspect, a method for operating a fastener system is provided that includes threading a spindle bolt into a nut to decrease an axial distance between an upper clamping surface in a bolt body and a lower clamping surface in an expandable ring, where an anti-rotation extension in the nut mates with an anti-rotation slot in the spindle body, and increasing a diameter of the expandable ring through interaction between a ramp in the bolt body spaced away from the upper clamping surface and a surface of the expandable ring. In one example, the method may also include unthreading the spindle bolt from the nut to increase the axial distance between the upper clamping surface and the lower clamping surface, and decreasing the diameter of the expandable ring.

In any of the aspects or combinations of the aspects, the bolt body may include a ramp at an end of the bolt body spaced away from an upper clamping surface in the bolt body and where the ramp interacts with the expandable ring to radially expand the expandable ring when the spindle bolt is threaded into the nut to transition the fastener system in the clamping configuration from the installation configuration.

In any of the aspects or combinations of the aspects, the expandable ring may include an expansion slot accommodating radial expansion of the expandable ring.

In any of the aspects or combinations of the aspects, the expandable ring may include a tang extending radially inward and where, in the clamping configuration, the tang mates with the anti-rotation slot.

In any of the aspects or combinations of the aspects, the expandable ring may include a tang extending radially inward and where, in the clamping configuration, the tang mates with the anti-rotation slot.

In any of the aspects or combinations of the aspects, the anti-rotation slot may axially traverse the bolt body from an end of the bolt body spaced away from a crown of the bolt body to an upper clamping surface.

In any of the aspects or combinations of the aspects, the expandable ring may be mated with a gap in the nut.

In any of the aspects or combinations of the aspects, the expandable ring may include two or more tangs extending radially inward from the lower clamping surface.

In any of the aspects or combinations of the aspects, the bolt body may include an upper clamping surface.

In any of the aspects or combinations of the aspects, where the anti-rotation slot may extend through a wall of the bolt body and where the anti-rotation slot is axially aligned.

In any of the aspects or combinations of the aspects, the fastener system may further include a spring and a washer coupled to an end of the spindle bolt spaced away from the head and where the spring exerts a radial force on the nut in the installation configuration.

In any of the aspects or combinations of the aspects, the head of the spindle bolt may not extend axially above a crown of the bolt body.

In any of the aspects or combinations of the aspects, the spindle bolt may include an unthreaded section below the threaded section.

In any of the aspects or combinations of the aspects, the expandable ring may include a tang extending radially inward and where, in the clamping configuration, the tang mates with the anti-rotation slot and the nut includes an anti-rotation extension mated with the anti-rotation slot.

In any of the aspects or combinations of the aspects, the expandable ring may include an expansion slot accommodating radial expansion of the expandable ring.

In any of the aspects or combinations of the aspects, in an installation configuration, an outer diameter of the lower clamping surface may be less than an outer diameter of the lower clamping surface in the clamping configuration.

In any of the aspects or combinations of the aspects, the expandable ring may be mated with a gap in the nut.

In any of the aspects or combinations of the aspects, the expandable ring may include an expansion slot accommodating the increase and the decrease in the diameter of the expandable ring.

In any of the aspects or combinations of the aspects, the lower clamping surface may be planar and radially aligned.

In any of the aspects or combinations of the aspects, where the two or more tangs may be equally spaced around the expandable ring.

Note that the example control and estimation routines included herein can be used with various fastener system configurations. The control methods and routines disclosed herein may be stored as executable instructions in non-transitory memory and may be carried out by tooling apparatuses.

The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the fastener system and/or tooling apparatus, where the described actions are carried out by executing the instructions in a tooling apparatus and fastener system including the various components.

It will be appreciated that the configurations and routines disclosed herein are exemplary in nature, and that these specific embodiments are not to be considered in a limiting sense, because numerous variations are possible. For example, the above technology can be applied to a broad range of manufacturing fields such as the aerospace industry, the construction industry, the maritime industry, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fastener system, comprising:
    a spindle bolt having a threaded section and a tooling interface at a head;
    a bolt body at least partially mated with the spindle bolt; and
    an expandable ring mated with a nut and including a lower clamping surface;
    where, in a clamping configuration, the lower clamping surface extends beyond the outer surface of the bolt body;
    where, in an installation configuration, an outer diameter of the lower clamping surface is less than an outer diameter of the lower clamping surface in the clamping configuration; and
    where the expandable ring includes one or more tangs extending radially inward from the lower clamping surface.

2. The fastener system of claim 1, where the bolt body includes a ramp at an end of the bolt body spaced away from an upper clamping surface in the bolt body and where the ramp interacts with the expandable ring to radially expand the expandable ring when the spindle bolt is threaded into the nut to transition the fastener system in the clamping configuration from the installation configuration.

3. The fastener system of claim 1, where the expandable ring includes an expansion slot accommodating radial expansion of the expandable ring.

4. The fastener system of claim 1, where, in the clamping configuration, the one or more tangs mate with an anti-rotation slot in the bolt body.

5. The fastener system of claim 1, where the bolt body includes an anti-rotation slot that axially traverses the bolt body from an end of the bolt body spaced away from a crown of the bolt body to an upper clamping surface.

6. The fastener system of claim 1, where the expandable ring is mated with a gap in the nut.

7. The fastener system of claim 1, where the expandable ring includes two or more tangs extending radially inward from the lower clamping surface.

8. The fastener system of claim 1, where the bolt body includes an upper clamping surface.

9. The fastener system of claim 1, where the bolt body includes an anti-rotation slot that extends through a wall of the bolt body and where the anti-rotation slot is axially aligned.

10. The fastener system of claim 1, further comprising a spring and a washer coupled to an end of the spindle bolt spaced away from the head and where the spring exerts a radial force on the nut in the installation configuration.

11. The fastener system of claim 1, where the head of the spindle bolt does not extend axially above a crown of the bolt body.

12. The fastener system of claim 1, where the spindle bolt includes an unthreaded section below the threaded section.

13. A fastener system, comprising:
    a spindle bolt having a threaded section and a tooling interface at a head;
    a bolt body at least partially mated with the spindle bolt, including an outer surface, an upper clamping surface, and a ramp at an end of the bolt body spaced away from the upper clamping surface; and an expandable ring mated with a nut and including a lower clamping surface and a tang extending radially inwardly;

where, when transitioning the fastener system to a clamping configuration, the ramp interacts with the expandable ring to radially expand the expandable ring when the spindle bolt is threaded into the nut to place the fastener system in the clamping configuration where the lower clamping surface extends beyond the outer surface of the bolt body.

14. The fastener system of claim 13, where, in the clamping configuration, the tang mates with an anti-rotation slot in the bolt body and the nut includes an anti-rotation extension mated with the anti-rotation slot.

15. The fastener system of claim 13, where the expandable ring includes an expansion slot accommodating radial expansion of the expandable ring.

16. The fastener system of claim 13, where, in an installation configuration, an outer diameter of the lower clamping surface is less than an outer diameter of the lower clamping surface in the clamping configuration.

17. The fastener system of claim 13, where the expandable ring is mated with a gap in the nut.

* * * * *